United States Patent
Kimura et al.

(10) Patent No.: US 6,439,666 B1
(45) Date of Patent: Aug. 27, 2002

(54) PAN FRAME STRUCTURE OF SEAT CUSHION OF A VEHICLE SEAT

(75) Inventors: Toshimitzu Kimura; Masami Muraishi, both of Akishima (JP)

(73) Assignee: Tachi-S, Co., Ltd., Tokyo (JP)

( * ) Notice: Subject to any disclaimer, the term of this patent is extended or adjusted under 35 U.S.C. 154(b) by 0 days.

(21) Appl. No.: 09/618,629

(22) Filed: Jul. 18, 2000

(30) Foreign Application Priority Data

Nov. 24, 1999 (JP) .................................... 11-332248

(51) Int. Cl.[7] ................................................ A47C 7/02
(52) U.S. Cl. .............................. 297/452.55; 297/452.24
(58) Field of Search ................... 297/452.55, 452.24, 297/452.18

(56) References Cited

U.S. PATENT DOCUMENTS

| | | | |
|---|---|---|---|
| 526,273 A | * | 9/1894 | Wadsworth et al. |
| 4,509,796 A | * | 4/1985 | Takagi |
| 5,997,096 A | * | 12/1999 | Chen |

FOREIGN PATENT DOCUMENTS

| | | | |
|---|---|---|---|
| GB | 2143125 | * | 2/1985 |
| JP | 60-94836 | | 5/1985 |
| JP | 7-303541 | | 11/1995 |
| JP | 7-44938 | | 12/1995 |

* cited by examiner

*Primary Examiner*—Milton Nelson, Jr.
(74) *Attorney, Agent, or Firm*—Browdy and Neimark, P.L.L.C.

(57) ABSTRACT

A structure of the so-called "pan frame" of seat cushion for use with a vehicle seat, which includes a primary reinforcing pattern press formed therein. The primary reinforcing pattern has a flat bottom region defined on its top and protrudes from the bottom wall of the seat-cushion pan frame. The primary reinforcing pattern further communicates with the securing areas where the frame is to be secured to a floor side of the vehicle. Hence, most of a load applied to the pan frame is dispersed via such pattern toward the securing areas, while being absorbed thereby. An auxiliary reinforcing pattern is press formed in the primary reinforcing pattern such as to surround each of the securing areas, thereby blocking further transmission of the load thereto. The primary reinforcing pattern may be of a generally X-shaped channel configuration which communicates its four channel sections with the securing areas, whereas the auxiliary reinforcing pattern be of an annularly protruded configuration that surrounds each of the securing areas.

8 Claims, 2 Drawing Sheets

PAN FRAME STRUCTURE OF SEAT CUSHION OF A VEHICLE SEAT

BACKGROUND OF INVENTION

1. Field of the Invention

The present invention relates to a so-called "pan frame" of seat cushion for use with a vehicle seat, and in particular, to the structure of seat-cushion pan frame which is formed by a press working from a rigid plate material, such as a steel sheet.

2. Description of Prior Art

A typical seat cushion of a vehicle or automotive seat is generally composed of an elastic padding and a covering material affixed thereon, with a seat cushion frame provided for supportive receipt of the elastic padding. In most cases, the covering material is attached over a unit of the padding and seat cushion frame in an integral manner, thus presenting one integrated appearance of seat cushion.

Among various kinds of frameworks for the seat cushion, known is the so-called "pan frame" which is one unitary frame formed in a pan-like configuration by press working from a rigid material or a seat steal for instance. This seat-cushion pan frame is normally fixed on the floor of vehicle or automobile via securing members. In general, the pan frame has two securing areas in pairs therein, which are fixed via securing bolts to a corresponding one of a pair of slide rails (as at (SL) in FIG. 2) fixed on the floor.

Such seat-cushion pan frame is supported only at those securing points on the floor, slide rail or the like, which means that a load from an occupant thereon will be intensively exerted on the securing points, such as securing holes in the frame and the bolts. Over a lengthy period of its use with an automotive seat, the pan frame receives a continued load and vibrations from the occupant and automobile for a long mileage of driving, resulting in a considerable wear or metal fatigue in the frame. As a result, it is possible that the frame will be deformed, causing an unstable poor seating touch of the seat cushion as a whole, and further, the less stiff areas of the frame, i.e. the securing holes of frame through which the securing bolts pass, will become lower in strength, and, in the worst case, the peripheral regions of each securing hole might be broken and cracked.

Conventionally, to solve that problem, provision of reinforcing members to the whole pan frame or to the securing holes of the frame and increase of the frame thickness for that purpose have been proposed and effected to avoid the lowered strength of the frame and local areas adjacent the securing holes. However, such provision of reinforcing members has led to increase of fitting parts and intricate structure of the frame, while the thickened frame has encountered the increased size and weight of frame itself. Those hitherto breakthroughs are found hardly acceptable cost-wise and in assembly of the frame.

SUMMARY OF THE INVENTION

In view of the above-stated drawbacks, it is a main purpose of the present invention to provide an improved structure of seat-cushion pan frame for use with a seat back of a vehicle seat, which is of a much simplified structure adaptable for easy use with the seat back, while effectively reinforcing the pan frame itself by dispersing a load applied to the frame toward securing areas of the pan frame.

To attain such purpose, according to the present invention, in a seat-cushion pan frame wherein its securing areas are distributed therein in a mutually spaced-apart manner and adapted to be secured to a side of floor of the vehicle seat, the structure of this particular frame basically comprises:

a bottom wall defined in the seat-cushion pan frame; and a reinforcing pattern so press formed in the bottom wall during a press working process as to protrude therefrom, with a flat bottom region defined therein;

the reinforcing pattern being arranged in the bottom wall such as to communicate with the foregoing securing areas.

Accordingly, since such integral reinforcing pattern is relatively large in width due to the formation of flat bottom region therein and also communicates with the securing areas, a load applied to the pan frame will be dispersed and absorbed by the reinforcing pattern, so that a weakened load will be immediately transmitted towards the securing areas and escaped therefrom to the outside of pan frame, e.g. the floor of vehicle or automobile. Preferably, the reinforcing pattern may comprise a generally X-shaped reinforcing channel having its four channel sections, such that each of the four channel sections has a flat bottom region defined therein and therealong, and extends to the securing areas in communication therewith.

It is a second purpose of the present invention to positively reinforce the afore-said securing areas of the pan frame in addition to the above-discussed structure.

For that purpose, in accordance with the present invention, the structure of seat-cushion pan frame may basically comprise:

(a) a bottom wall defined in the seat-cushion pan frame, said bottom wall having a right surface side inwardly of the seat-cushion pan frame and a reverse surface side outwardly thereof;

(b) a primary reinforcing pattern so press formed in the bottom wall during the press working process as to protrude therefrom with a flat bottom region defined therein, the reinforcing pattern being arranged in the bottom wall such as to communicate with the securing areas; and (c) an auxiliary reinforcing pattern so pressed formed in the primary reinforcing pattern during the press working process as to protrude from a plane at which there lies the foregoing right surface side of said bottom wall, and surround each of said securing areas.

Accordingly, the provision of such auxiliary reinforcing pattern is effective in surrounding and isolating the securing areas from other areas of the pan frame including the primary reinforcing pattern, whereupon a load applied to the pan frame is blocked by the auxiliary reinforcing pattern against transmission to the securing areas and will be changed thereby in direction so that it is smoothly escaped to the outside of pan frame.

Other advantages and features of the present invention will become apparent from reading of the description hereinafter, with reference to the drawings.

DETAILED DESCRIPTION OF PREFERRED EMBODIMENT OF THE INVENTION

Figure 1:
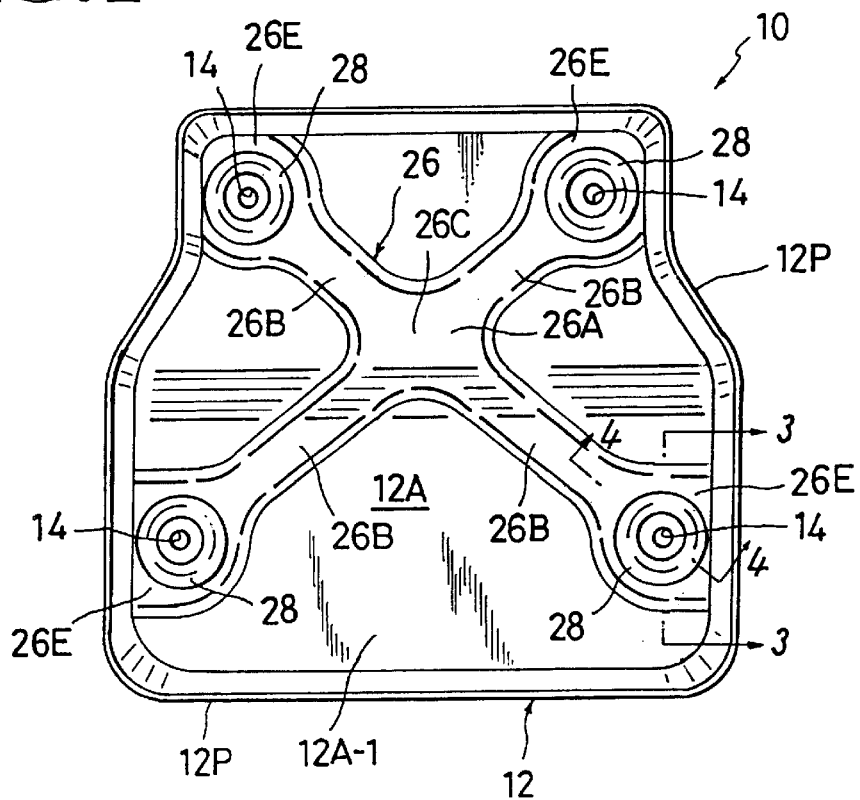
FIG. 1 is a schematic plan view of a structure of seat-cushion pan frame in accordance with the present invention, which shows its inward right surface side, as viewed from the above.
Figure 2:
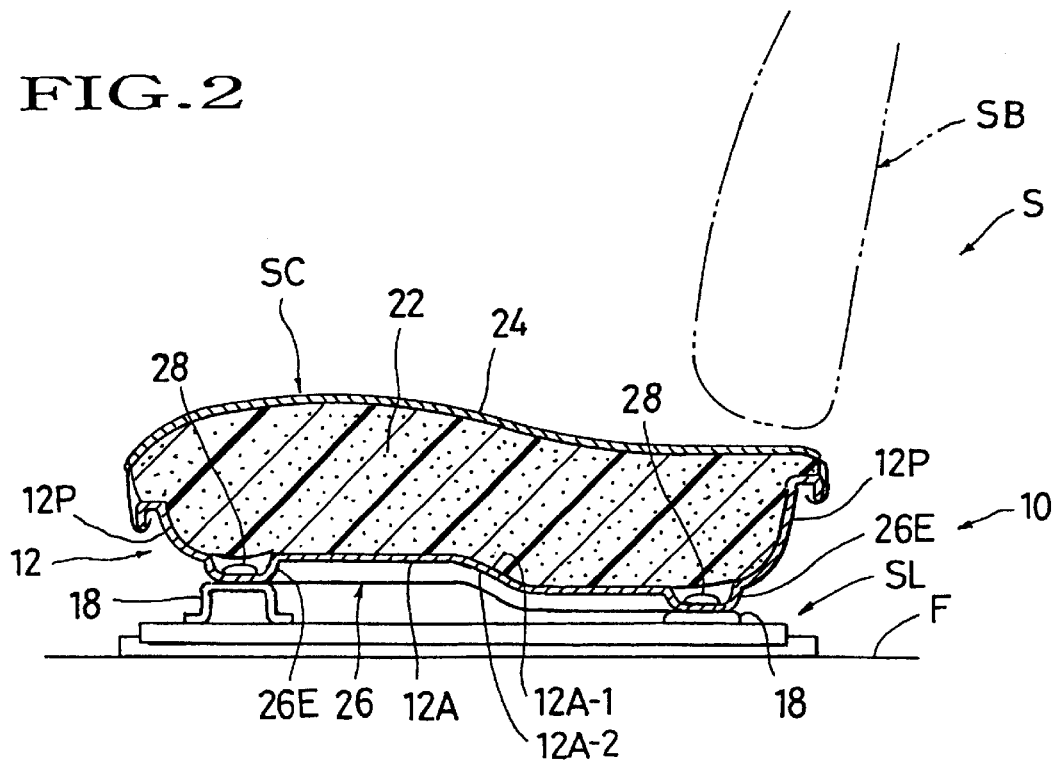
FIG. 2 is a schematic longitudinally sectional view of a seat cushion of a vehicle seat, to which the pan frame structure of the present invention is applied.

In the present invention, a whole structure of seat-cushion pan frame is best illustrated in the front view of FIG. 1, as generally designated by (10). The seat-cushion pan frame structure is to be incorporated in a seat cushion (SC) which forms a part of a vehicle or automotive seat (S), as indicated in FIG. 2 for example. The seat-cushion frame structure (10) uses a pan-type frame (12) discussed earlier, as a seat cushion frame. The illustrated mode of pan frame (12) is of a generally rectangular shape in the plan as viewed from FIG. 1, having four corners. Formed respectively adjacent to the four corners of frame (12) are each securing hole or through-hole (14) adapted for allowing a securing bolt (see (16) in FIG. 3) to be inserted thereth rough. Hence, as can be seen from FIGS. 2 and 3, the pan frame (12) may be fixedly connected to the floor side (F) by those four bolts (16) being threadedly fastened to predetermined threaded holes or nut members which are for example formed at the support brackets (18) fixed on the slide rail device (SL).

As shown in FIG. 2, the pan frame (12) per se is formed by press working process from a sheet of steel, for instance, into a typical pan configuration having a generally U-shaped cross-section that basically comprises a generally flat bottom wall (12A) and an upstanding peripheral wall (12P) integrally surrounding the bottom wall (12A). As shown, a foam padding or cushion member (22) is placed in such pan frame (12) and a trim cover assembly (24) is affixed on the cushion member (22). The trim cover assembly (24) is, at its peripheral end, overhung and secured to the peripheral wall (12P) of pan frame (12), so that a seat cushion (SC) is created, with a comfortable cushiony touch, as known in the art.

Figure 3:
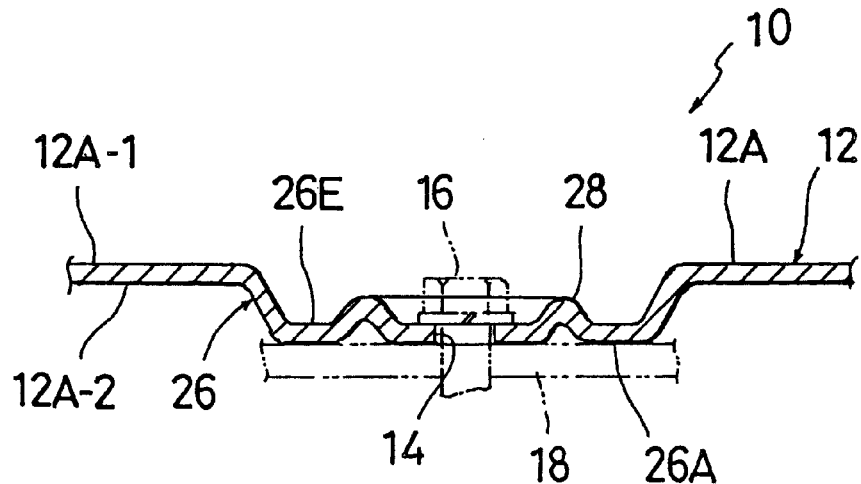
FIG. 3 is a partly broken sectional view taken along the line 3—3.

Referring again to FIG. 1, in accordance with the pan fame structure of the present invention, a primary reinforcing uneven pattern is defined integrally in the flat bottom wall (12A) of pan frame (12) such as to expand its reinforcing pattern from the center of the frame in a direction to mutually spaced-apart securing areas (at 14) of the frame which are adapted for fixedly securing the frame to the side of floor (F) of vehicle or automobile. This is based upon the reason that an external load or force applied to a flat plate will run intensively toward an uneven or deformed point in the flat plate. Formation of the integral primary pattern in the flat bottom of pan frame (12) takes advantage of such reason and serves as a load dispersion means through which a load is dispersed and escaped to the outside of frame (12). Needless to state, the primary reinforcing pattern has been press formed in one unitary raw plate material (e.g. a steel sheet) during a press working process, while pressing the plate material into a predetermined pan shape of frame (12). Preferably, the primary reinforcing pattern may be embodied by a generally X-shaped reinforcing channel, as designated by (26) in FIG. 1, in such fashion that extends its four channel sections (12B) in the bottom of resulting pan frame (12) towards two lateral side regions of the frame (12) where the securing areas are located. The securing areas may each be embodied by a pair of right securing holes (14) and a pair of left securing holes (14), respectively. As indicated in FIG. 3, a bolt (16) is to pass through each of the holes (14) for the purpose of securely fastening the whole of pan frame (26) to a suitable securing member (i.e. brackets (18) and slide rail (SL)) fixed on the floor (F). Accordingly, it is to be appreciated that a load applied from a passenger to the frame (12) will be effectively dispersed and escaped through that X-shaped reinforcing pattern or channel (26) to the securing areas of frame (12) (i.e. the both lateral side regions of frame (12) in the shown embodiment), whereby a substantive amount of the load can be immediately dispersed in four directions and escaped via the securing points, i.e. the four securing holes (14) and bolts (16), toward the side of floor (F).

Specifically, referring to FIGS, 1 and 2, the illustrated primary reinforcing channel (26) is so press formed in a generally "X" shape as to protrude integrally from the generally flat reverse side (12A-2) of pan frame bottom wall (12A), having a widened flat bottom region (26A) defined therein and therealong. Thus, this press-formed channel (26) represents, upon the inward right side (12A-1), a downwardly recessed "X" form with a relatively large width, as in FIG. 2. In such primary channel (26), therefore, a central widen area (26C) is defined substantially at a center of the pan frame (14), while four rectilinearly extending channel sections (26B), each with a relatively large width, run therefrom diagonally towards the four securing areas of pan frame (12), i.e. a pair of right securing holes (14) and a pair of left securing holes (14) which are formed symmetrically relative to a center of the frame (12). Preferably, the central area (26C) may be defined at a point in the pan frame (12) where a weight of a passenger sitting thereon is directly and intensively applied; that is, a point near to the rearward half of frame (12) adjacent a seat back (SB) as can be seen from both FIGS. 1 and 2.

More preferably, as shown in FIG. 1, a more widened end area (26E) may be defined in each of the ends respectively of the four channel sections (26B) such as to surround each of the securing points, i.e. securing holes (14), and communicate with the upright peripheral wall (12P) of frame (12) at a point in the vicinity to the four corners of the same (12). This advantageously contributes to a high load dispersion and absorption as well as an increased strength of the pan frame (12).

Accordingly, the above-constructed X-shaped primary reinforcing channel (26) is of a far-increased rigidity, providing a high reinforcing effect to the pan frame (12), and also establishes a wide load dispersion passage oriented toward all the securing areas of pan frame (12) as well as toward the robust four corners thereof, so that an externally applied load may be effectively dispersed thereto with much efficiency, while being absorbed thereby at the same time, and escaped to the side of floor (F).

In accordance with the present invention, defined further integrally in the bottom wall (12A) of pan frame (12) is an auxiliary reinforcing pattern such as to encircle and isolate each of the securing areas, i.e. each four securing hole (14), from the surrounding areas of pan frame (12) including the primary reinforcing channel (26). Such auxiliary reinforcing pattern may be embodied by an annular press-formed protrusion (28) which is integrally formed in each of the afore-said widened areas (26E) associated with the primary reinforcing channel (26). As shown in FIGS. 1 and 3, each of the four annular protrusions (28) is press formed coaxial with each hole (14), assuming a ringed pattern extending around the hole (14) in a spaced relation therewith. As best seen from FIG. 3, all such auxiliary reinforcing annular protrusions (28) protrude from the plane at which there lies the right inward surface side (12A-1) of pan frame (12), having a generally inverted-U-shaped cross-section, as viewed in this particular state. Of course, the annular protrusions (28) have also been press formed during the press working process for forming the above-described structure of pan frame (12).

Figure 4:
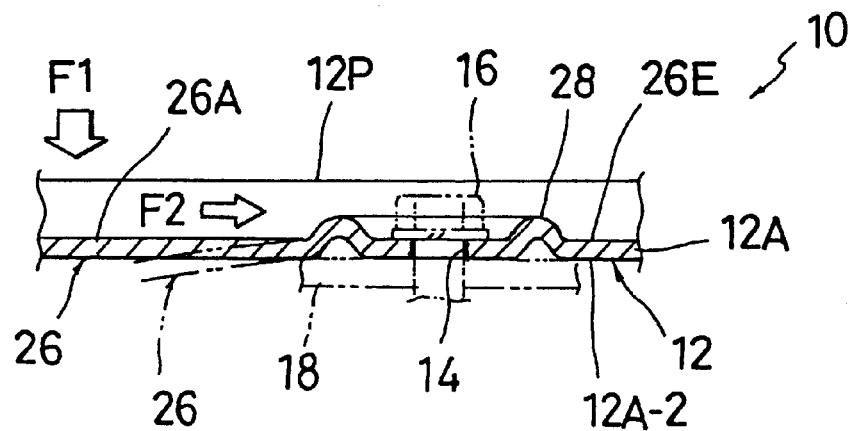
FIG. 4 is a partly broken sectional view taken along the line 4—4.

All those four auxiliary reinforcing protrusions (28) thus formed in the respective four widened areas (26E) function to absorb a load being transmitted via the corresponding four channel sections (26B) to the holes (14) and disperse the same radially and downwardly toward the reverse side (12A-2) where a securing member, i.e. the bracket (18), normally lies, without direct impact being exerted on the holes (14). More specifically stated, referring to FIG. 4, a downward external load (F1) applied to the pan frame (12) is dispersed and transmitted in the X-shaped primary reinforcing channel (26) towards the four securing holes (14), at which moment, the load (F1) is transmitted as a horizontal load (F2) along the channel (26) or its channel section (26B) towards the hole (14). But, the provision of such annular protrusion (28), due to its inverted-U-shaped cross-section, causes the corresponding channel section (26B) to tend to deform downwardly relative to the protrusion (28) in the same direction with that of the first downward load (F1), as indicated by the two-dot chain line of FIG. 4. This downward deformable tendency, caused in the local part of channel section (26B) adjacent the protrusion (28), effectively changes the horizontal direction of load (F2) into a vertical direction toward the reverse side (12A-2) by way of the channel section (26B) itself, thereby blocking direct transmission of the force (F2) to the hole (14). Hence, most of the load (F1) will be finally dispersed by the annular protrusions (28), without its direct transmission to the holes (14), and escaped to the side of floor (F) via a bracket (18) or other securing members, as understandable from FIG. 4. In other words, it is seen that each hole (14) is completely isolated by each annular protrusion (28) from other surrounding areas of pan frame (12) as well as from the load transmission passages of the X-shaped primary channel (26). Accordingly, an input load (F1) from a passenger is thereby positively blocked against transmission to the securing holes (14), which insures to avoid lowering of strength of the holes (14) and thus avoid an eventual metal fatigue in the frame (12) in the area surrounding the holes (14).

With the structure discussed above, it is therefore appreciated that, first, the generally "X" shape of primary reinforcing channel (26) works to disperse and absorb a whole amount of load applied to the pan frame (12) through the widened flat passages (at 26a) respectively of the four channel sections (26B) in a generally diagonal direction to the four robust corners of pan frame (12), thereby effectively reinforcing the frame (12) per se while distributing the thus-weakened load uniformly to the securing points, i.e. the four securing holes (14) and bolts (16), and that, secondly, the auxiliary reinforcing annular protrusions (28) serve to block direct transmission of the load to the corresponding four securing holes (14) and bolts (16) to thereby insure preventing them against strength decrease and metal fatigue in the adjacent areas of frame (2). This dual load dispersion and reduction structure works well against an excessive great load which is abruptly applied to the pan frame (2) in a collision or other emergency cases, since the great load will be weakened to a substantive low degree via the two reinforcing patterns (26) (28), with the result that both holes (14) and bolts (15) are in no way damaged and deformed by such extremely reduced load.

The primary reinforcing pattern (as at 26) itself is not limited to the illustrated "X" shape, but may be of a generally "H" shape, or other suitable configuration which will immediately disperse a load in a radial direction to the securing points of the pan frame (12). In this respect, however, the generally "X" shape is an optimum configuration of the primary reinforcing pattern in view of the pan frame (12) having diagonally-disposed four securing points (at 14) therein as commonly found in vehicle seats, insofar far as the four channel sections (26B) thereof each has a shortest possible distance to the respective diagonally-disposed four securing points (at 14) on a rectilinear line. For, this particular "X" formation is deemed superior to other most simplified reinforcing patterns conceivable on the pan frame, in terms of its smooth, quick and uniform transmission of a load to the diagonally-arranged four securing areas that are commonly provided in vehicle seats, as well as in terms of effective load dispersion and absorption for keeping the rigidity of the pan frame itself at a high degree.

Also, the auxiliary reinforcing pattern (as at 28) may be of any other suitable shape sufficient to surround the hole (14) on the flat plane, such as in generally elliptic or polygonal shape that encircles the same in a spaced relation therewith.

While having described the present invention so far, it should be understood that the invention is limited to all the illustrated embodiments, and any other modifications, replacements and additions may be structurally applied thereto without departing from the scopes of the appended claims. Of course, the structure of the present invention is also applicable to other ordinary seat-cushion pan frames used in a seat of any other vehicles, such as train, airplane and vessel.

What is claimed is:

1. In combination with a vehicle seat and a vehicle floor, in which the vehicle seat includes a seat cushion, a structure of a seat-cushion pan frame to be provided in said seat cushion, wherein the seat-cushion pan frame has been formed by a press working process from a rigid plate material into a predetermined configuration, said structure of the seat-cushion pan frame comprising:

a bottom wall defined in the seat-cushion pan frame;

two lateral side regions defined within the bottom wall;

four securing areas adapted to be secured to a side of said vehicle floor, said four securing areas comprising one set of two securing holes and another set of two securing holes, wherein said one and said another set of two securing holes are respectively defined in said two lateral side regions within said bottom wall;

a generally X-shaped reinforcing pattern having four channel sections formed continuous with one another, wherein each of said four channel sections has a flat bottom region defined therein and therealong, and respectively extends toward a securing hole of said four securing holes in communication therewith; and four securing means adapted to be respectively passed through said four securing holes for fixedly securing said seat-cushion pan frame to a side of the floor.

2. The combination according to claim 1, wherein said generally X-shaped reinforcing channel has a flat central bottom region defined therein at a point where a load is intensively applied in said seat-cushion pan frame.

3. The combination according to claim 1, which further includes an upstanding peripheral wall integrally formed with said seat-cushion pan frame during said press working process, said upstanding peripheral wall integrally surrounding said bottom wall, and wherein said four channel sections are so arranged in said bottom wall as to not only communicate with said four securing holes, but also communicate with said upstanding peripheral wall.

4. The combination according to claim 3, wherein said four channel sections each include a widened end area defined therein, and wherein said widened end area surrounds each of said securing holes and communicates with said upstanding peripheral wall.

5. The combination according to claim 1, wherein said reinforcing pattern includes an auxiliary reinforcing pattern arranged therein such as to encircle each of said securing areas, said auxiliary reinforcing pattern being so press formed as to have a generally U-shaped cross-section during said press working process.

6. The combination according to claim 5, wherein said auxiliary reinforcing pattern comprises an annular auxiliary reinforcing protrusion so formed to encircle each of said securing areas in a spaced relation therewith.

7. In combination with a vehicle seat and a vehicle floor, in which the vehicle seat includes a seat cushion, a structure of a seat-cushion pan frame to be provided in said seat cushion, wherein the seat-cushion pan frame has been formed by a press working process from a rigid plate material into a predetermined configuration, said structure of the seat-cushion pan frame comprising:

a bottom wall defined in the seat-cushion pan frame, said bottom wall having a right surface side inwardly of the seat-cushion pan frame and a reverse surface side outwardly thereof;

two lateral side regions defined within the bottom wall;

four securing areas adapted to be secured to a side of said vehicle floor, said four securing areas comprising one set of two securing holes and another set of two securing holes, wherein said one and said another set of two securing holes are respectively defined in said two lateral side regions within said bottom wall;

a generally X-shaped reinforcing pattern so press formed in said bottom wall during said press working process as to have four channel sections continuous with one another, wherein each of said four channel sections has a flat bottom region defined therein and therealong, and respectively extends toward a securing hole of said four securing holes in communication therewith;

an auxiliary reinforcing pattern so press formed in said generally X-shaped reinforcing pattern during said press working process as to protrude from a plane at which there lies said right surface side of said bottom wall, while surrounding each of said four securing areas; and four securing means adapted to be respectively passed through said four securing holes for fixedly securing said seat-cushion pan frame to a side of the floor.

8. The combination according to claim 7, wherein said auxiliary reinforcing pattern comprises four annular auxiliary reinforcing protrusions, each having a generally inverted-U-shaped cross-section, which protrudes from said plane, and wherein each of said four annular auxiliary reinforcing protrusions respectively encircling said four securing holes in a spaced relation therewith.

* * * * *